United States Patent
Dede

(10) Patent No.: US 10,579,069 B2
(45) Date of Patent: Mar. 3, 2020

(54) AUTONOMOUS DRIVING SYSTEMS USING AERIAL VEHICLES

(71) Applicant: Toyota Motor Engineering & Manufacturing North America, Inc., Erlanger, KY (US)

(72) Inventor: Ercan M. Dede, Ann Arbor, MI (US)

(73) Assignee: TOYOTA MOTOR ENGINEERING & MANUFACTURING NORTH AMERICA, INC., Plano, TX (US)

(*) Notice: Subject to any disclaimer, the term of this patent is extended or adjusted under 35 U.S.C. 154(b) by 313 days.

(21) Appl. No.: 15/728,217

(22) Filed: Oct. 9, 2017

(65) Prior Publication Data

US 2019/0107843 A1    Apr. 11, 2019

(51) Int. Cl.
| | |
|---|---|
| G05D 1/02 | (2020.01) |
| B64C 39/02 | (2006.01) |
| G01C 21/28 | (2006.01) |
| G05D 1/00 | (2006.01) |

(Continued)

(52) U.S. Cl.
CPC ............ G05D 1/0285 (2013.01); B60L 53/12 (2019.02); B64C 39/024 (2013.01); G01C 21/28 (2013.01);
(Continued)

(58) Field of Classification Search
CPC .. G05D 1/0285; G05D 1/0246; G05D 1/0202; G05D 1/0088; G05D 1/102;
(Continued)

(56) References Cited

U.S. PATENT DOCUMENTS

| | | | |
|---|---|---|---|
| 9,090,315 B1* | 7/2015 | Stone | H02J 50/90 |
| 9,409,644 B2 | 8/2016 | Stanek et al. | |

(Continued)

FOREIGN PATENT DOCUMENTS

| | | |
|---|---|---|
| CN | 103780313 A | 5/2014 |
| CN | 105549494 A | 5/2016 |

(Continued)

OTHER PUBLICATIONS

Science X Network, "Ford Studies Using Drones to Guide Self-Driving Cars", Phys. org 2003-2017, 3 pages.

(Continued)

*Primary Examiner* — Mary Cheung
(74) *Attorney, Agent, or Firm* — Dinsmore & Shohl LLP

(57) ABSTRACT

An autonomous driving system includes an aerial vehicle and an autonomous vehicle. The aerial vehicle includes an imaging device configured to obtain map data, an optical-to-electrical transducer configured to convert optical power to electrical power for operating the aerial vehicle, one or more processors, one or more memory modules, and machine readable instructions stored in the one or more memory modules of the aerial vehicle that, when executed by the one or more processors, cause the aerial vehicle to output the map data. The autonomous vehicle includes an optical power generator configured to transmit an optical power beam to the optical-to-electrical transducer of the aerial vehicle. The autonomous vehicle receives the map data output by the imaging device from the aerial vehicle.

20 Claims, 6 Drawing Sheets

(51) Int. Cl.
*B60L 53/12* (2019.01)
*H04W 88/08* (2009.01)

(52) U.S. Cl.
CPC ......... *G05D 1/0088* (2013.01); *G05D 1/0202* (2013.01); *G05D 1/0246* (2013.01); *B60L 2200/10* (2013.01); *B64C 2201/127* (2013.01); *H04W 88/08* (2013.01)

(58) Field of Classification Search
CPC .... B60L 53/12; B60L 2200/10; B64C 39/024; B64C 2201/127; G01C 21/28; H04W 88/08
See application file for complete search history.

(56) References Cited

U.S. PATENT DOCUMENTS

| | | | | |
|---|---|---|---|---|
| 9,457,915 | B2* | 10/2016 | Wang | ........................ B64F 1/00 |
| 9,494,937 | B2 | 11/2016 | Siegel et al. | |
| 2008/0162036 | A1* | 7/2008 | Breed | .................... G08G 1/161 |
| | | | | 701/408 |
| 2015/0034144 | A1* | 2/2015 | Stone | ..................... H02S 40/22 |
| | | | | 136/246 |
| 2015/0158513 | A1 | 6/2015 | Costa et al. | |
| 2017/0227470 | A1* | 8/2017 | Cesarano | ............. G05D 1/0214 |

FOREIGN PATENT DOCUMENTS

| | | |
|---|---|---|
| FR | 2986647 A3 | 8/2013 |
| KR | 20160088636 A | 10/2016 |
| WO | 2016102130 A1 | 6/2016 |

OTHER PUBLICATIONS http://www.i-runway.com, "My Navigation Buddy is a Drone!", 4 pages.

\* cited by examiner

AUTONOMOUS DRIVING SYSTEMS USING AERIAL VEHICLES

TECHNICAL FIELD

The present specification generally relates to autonomous driving systems using aerial vehicles and, more specifically, to autonomous driving systems where autonomous vehicles transmit optical power beams to aerial vehicles that convert optical power to electrical power.

BACKGROUND

Autonomous vehicles may require map data for driving. The map data may be pre-stored in autonomous vehicles. However, real-time map data including traffic information, obstacles on roads, or any other information that is related to driving the autonomous vehicle may be needed to enhance the drivability of the autonomous vehicles.

Accordingly, a need exists for obtaining real-time map data.

SUMMARY

In one embodiment, an autonomous driving system includes an aerial vehicle and an autonomous vehicle. The aerial vehicle includes an imaging device configured to obtain map data, an optical-to-electrical transducer configured to convert optical power to electrical power for operating the aerial vehicle, one or more processors, one or more memory modules communicatively coupled to the one or more processors, and machine readable instructions stored in the one or more memory modules of the aerial vehicle that, when executed by the one or more processors, cause the aerial vehicle to output the map data. The autonomous vehicle includes an optical power generator configured to transmit an optical power beam to the optical-to-electrical transducer of the aerial vehicle, one or more processors, one or more memory modules communicatively coupled to the one or more processors of the autonomous vehicle, and machine readable instructions stored in the one or more memory modules that, when executed by the one or more processors of the autonomous vehicle, cause the autonomous vehicle to receive the map data output by the imaging device from the aerial vehicle.

In another embodiment, an aerial vehicle includes an imaging device configured to obtain map data, an optical-to-electrical transducer configured to: receive an optical power beam from an optical power generator of an autonomous vehicle, and convert optical power of the optical power beam to electrical power for operating the aerial vehicle, one or more processors, one or more memory modules communicatively coupled to the processor, and machine readable instructions stored in the one or more memory modules that, when executed by the one or more processors, cause the aerial vehicle to output the map data to the autonomous vehicle.

In yet another embodiment, an autonomous vehicle includes an optical power generator, one or more processors, one or more memory modules communicatively coupled to the processor, and machine readable instructions stored in the memory module that, when executed by the one or more processors, cause the autonomous vehicle to: transmit, by the optical power generator, an optical power beam to an aerial vehicle; and receive map data from the aerial vehicle.

These and additional features provided by the embodiments of the present disclosure will be more fully understood in view of the following detailed description, in conjunction with the drawings.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

Figure 1:
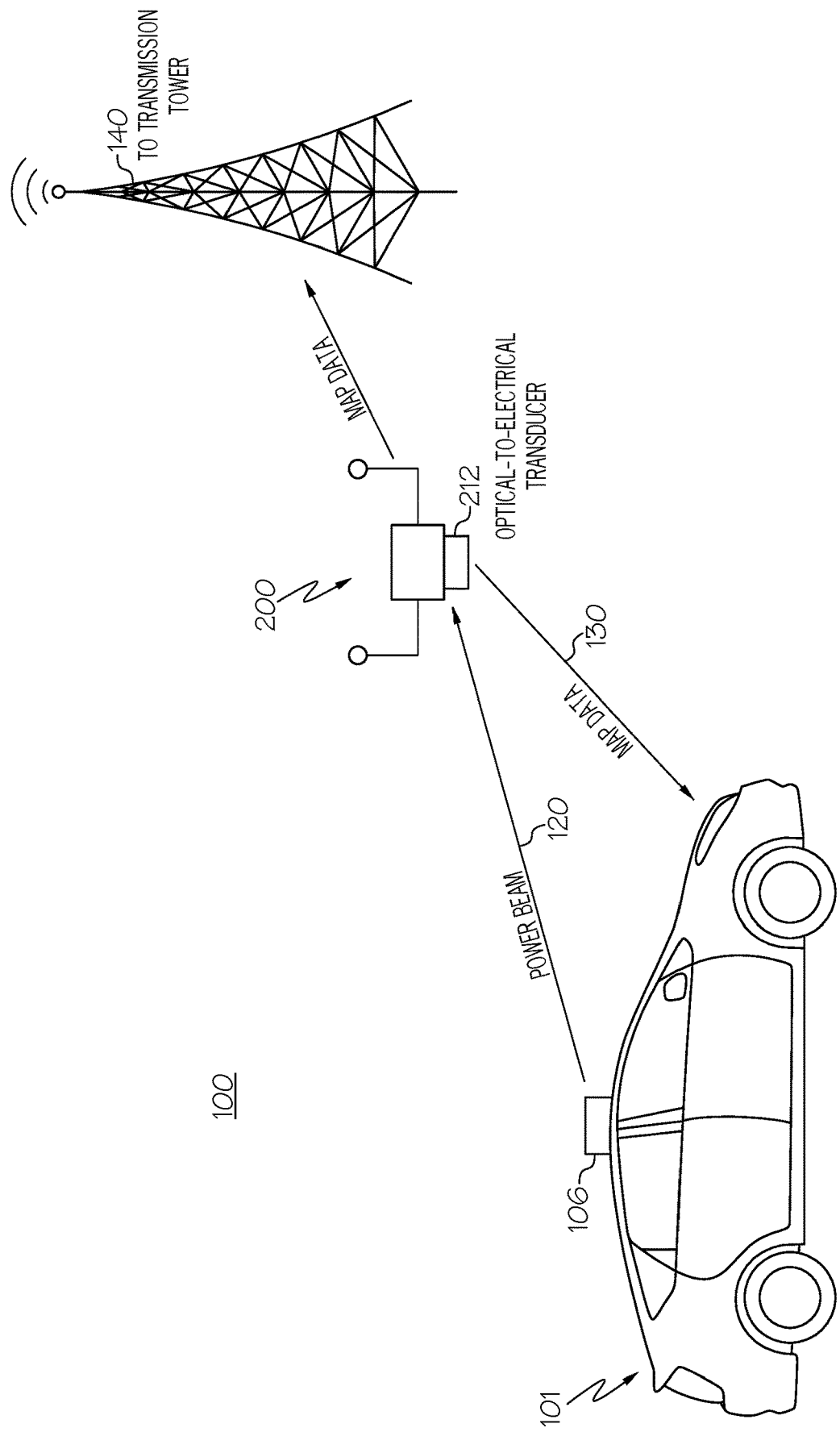
FIG. 1 schematically depicts an autonomous driving system, according to one or more embodiments shown and described herein.

The embodiments disclosed herein include autonomous driving systems using aerial vehicles. Referring generally to FIG. 1, an autonomous driving system includes an aerial vehicle and an autonomous vehicle. The aerial vehicle includes an imaging device configured to obtain map data, and an optical-to-electrical transducer configured to convert optical power to electrical power for operating the aerial vehicle. The aerial vehicle outputs the map data to the autonomous vehicle. The autonomous vehicle includes an optical power generator configured to transmit an optical power beam to the aerial vehicle. The autonomous vehicle receives the map data output by the imaging device from the aerial vehicle.

Referring now to FIG. 1, one embodiment of an autonomous driving system 100 is schematically depicted. The autonomous driving system 100 includes an autonomous vehicle 101 and an aerial vehicle 200. The autonomous vehicle 101 may be any type of vehicle system including, but not limited to, a car, a truck, a motorcycle, a bus, a boat, an airplane, a helicopter, a lawnmower, a recreational vehicle, an amusement park vehicle, a tram, a golf cart, a train, or a trolley. The autonomous vehicle 101 may be a fully autonomous vehicle, semi or partially autonomous vehicle, or a vehicle equipped with an advanced driver assist system (ADAS) such as adaptive cruise control and/or lane departure alert.

The aerial vehicle 200 may be an unmanned aerial vehicle (UAV) that is manufactured to fly without a pilot on board and to carry out a designated mission. Various equipment, such as optical devices, infrared devices, or radar sensors according to the fields of applications may be mounted on the aerial vehicle 200 to carry out missions such as surveillance, reconnaissance, communication/information broadcasting, etc.

The autonomous vehicle 101 includes an optical power generator 106 configured to output an optical power beam 120 to the aerial vehicle 200. The aerial vehicle 200 includes an optical-to-electrical transducer 212 that converts the optical power beam 120 received from the autonomous vehicle 101 to electrical power. The converted electrical power may be used to power the aerial vehicle and/or charge a power source, e.g., a rechargeable battery, which may be used to operate the aerial vehicle 200, e.g., operating motors of the aerial vehicle, etc.

The aerial vehicle 200 transmits map data 130 to the autonomous vehicle 101. The map data 130 may be obtained by an imaging device of the aerial vehicle 200. The map data 130 includes image data from the imaging device, processed image data, data generated based on the image data, etc. The imaging device will be described in detail with reference to FIG. 2. The autonomous vehicle 101 may use the map data 130 to obtain information on potential trajectories, traffic, obstacles on roads, or any other information that is related to driving the autonomous vehicle 101. The aerial vehicle 200 may transmit the map data 130 to a transmission tower 140 which may be remotely located. The transmission tower 140 may relay the map data 130 to other autonomous vehicles that are located within a predetermined distance from the autonomous vehicle 101. While FIG. 1 depicts one autonomous vehicle 101 and one aerial vehicle 200, a plurality of autonomous vehicles may interact with a plurality of aerial vehicles. For example, a plurality of autonomous vehicles may direct optical power beams to a single aerial vehicle, and a single aerial vehicle may transmit map data to a plurality of autonomous vehicles. As another example, a plurality of aerial vehicles may transmit map data to a single autonomous vehicle, and the single autonomous vehicle may direct an optical power beam to the plurality of aerial vehicles in turn.

Figure 2:
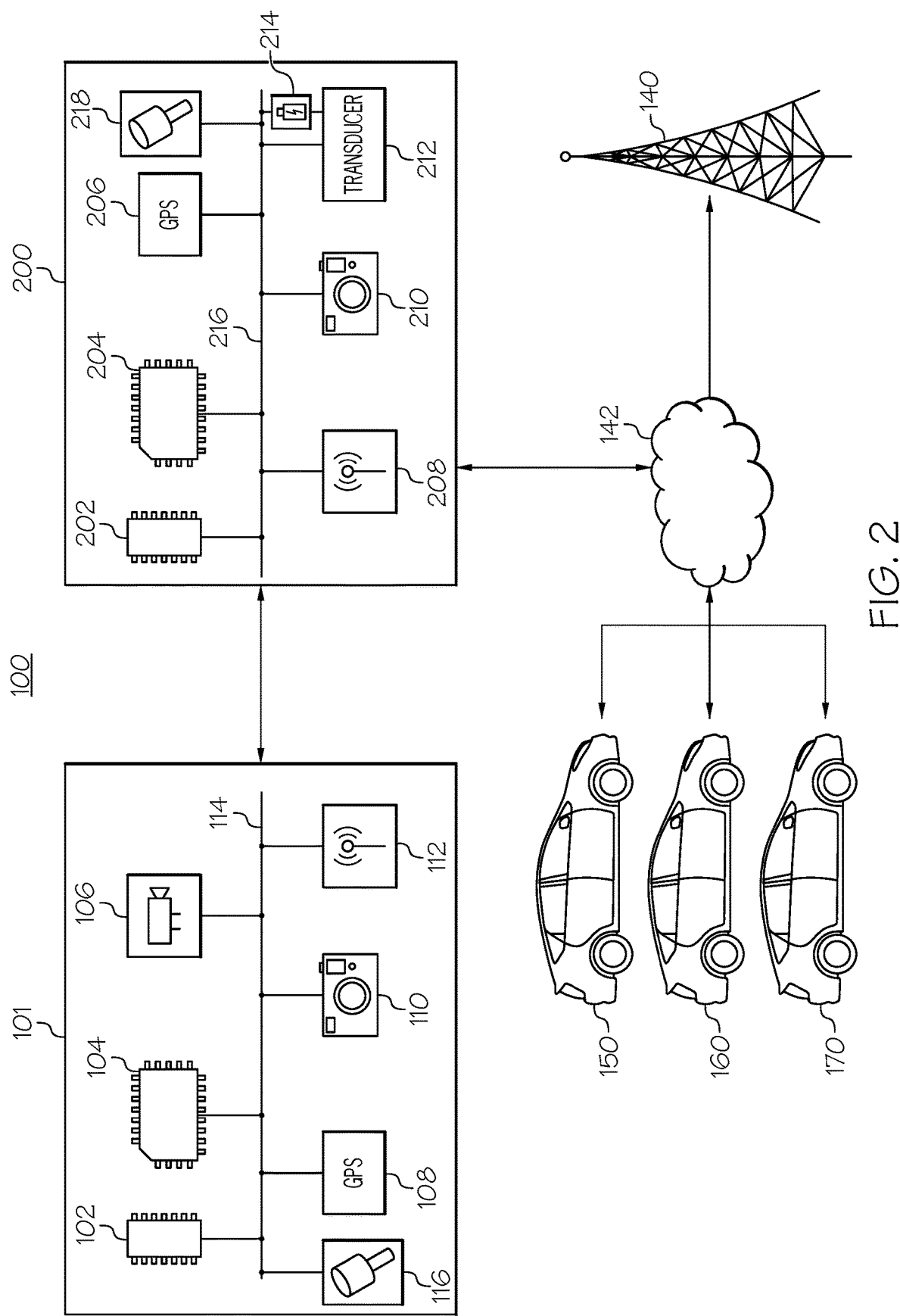
FIG. 2 depicts components of the autonomous driving system of FIG. 1, according to one or more embodiments shown and described herein.

Referring now to FIG. 2, components of the autonomous driving system 100 are schematically depicted. The autonomous driving system 100 includes the autonomous vehicle 101 and the aerial vehicle 200. The autonomous vehicle 101 includes one or more processors 102, one or more memory modules 104, the optical power generator 106, a satellite antenna 108, one or more cameras 110, a network interface hardware 112, a communication path 114, and one or more sensors 116.

The aerial vehicle 200 includes one or more processors 202, one or more memory modules 204, a satellite antenna 206, a network interface hardware 208, one or more cameras 210, the optical-to-electrical transducer 212, and one or more sensors 218. The various components of the autonomous vehicle 101 and the aerial vehicle 200 will be described in detail below.

Each of the one or more processors 102 of the autonomous vehicle 101 may be any device capable of executing machine readable instructions. Accordingly, each of the one or more processors 102 may be a controller, an integrated circuit, a microchip, a computer, or any other computing device. Each of the one or more processors 102 is communicatively coupled to the other components of the autonomous vehicle 101 by the communication path 114. Accordingly, the communication path 114 may communicatively couple any number of processors with one another, and allow the components coupled to the communication path 114 to operate in a distributed computing environment. Specifically, each of the components may operate as a node that may send and/or receive data.

Each of the one or more memory modules 104 of the autonomous vehicle 101 is coupled to the communication path 114 and communicatively coupled to the one or more processors 102. Each of the one or more memory modules 104 may comprise RAM, ROM, flash memories, hard drives, or any device capable of storing machine readable instructions such that the machine readable instructions can be accessed and executed by the one or more processors 102. The machine readable instructions may comprise logic or algorithm(s) written in any programming language of any generation (e.g., 1GL, 2GL, 3GL, 4GL, or 5GL) such as, for example, machine language that may be directly executed by the one or more processors 102, or assembly language, object-oriented programming (OOP), scripting languages, microcode, etc., that may be compiled or assembled into machine readable instructions and stored in the one or more memory modules 104. Alternatively, the machine readable instructions may be written in a hardware description language (HDL), such as logic implemented via either a field-programmable gate array (FPGA) configuration or an application-specific integrated circuit (ASIC), or their equivalents. Accordingly, the functionality described herein may be implemented in any conventional computer programming language, as pre-programmed hardware elements, or as a combination of hardware and software components.

The one or more memory modules 104 may include instructions for determining a location of the optical-to-electrical transducer 212 of the aerial vehicle 200, and instructions for directing an optical power beam to the optical-to-electrical transducer 212 of the aerial vehicle 200 based on the determined location. The location of the optical-to-electrical transducer 212 of the aerial vehicle 200 may be determined based on image data captured by the one or more cameras 110. In some embodiments, the location of the optical-to-electrical transducer 212 of the aerial vehicle 200 may be determined based on a location signal transmitted from the aerial vehicle 200. For example, the aerial vehicle 200 may transmit its GPS coordinates to the autonomous vehicle 101. The one or more memory modules 104 may also include instructions for determining whether the aerial vehicle 200 is within a predetermined distance of the autonomous vehicle 101, and directing an output power beam to the optical-to-electrical transducer 212 of the aerial vehicle 200 in response to determining that the aerial vehicle 200 is within the predetermined distance of the autonomous vehicle 101.

Still referring to FIG. 2, the communication path 114 may be formed from any medium that is capable of transmitting a signal such as, for example, conductive wires, conductive traces, optical waveguides, or the like. Moreover, the communication path 114 may be formed from a combination of mediums capable of transmitting signals. In one embodiment, the communication path 114 comprises a combination of conductive traces, conductive wires, connectors, and buses that cooperate to permit the transmission of electrical data signals to components such as processors, memories, sensors, input devices, output devices, and communication devices. Accordingly, the communication path 114 may comprise a bus. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium. The communication path 114 communicatively couples the various components of the autonomous vehicle 101. As used herein, the term "communicatively coupled" means that coupled components are capable of exchanging data signals with one another such as, for example, electrical signals via conductive medium, electromagnetic signals via air, optical signals via optical waveguides, and the like.

The optical power generator 106 is coupled to the communication path 114 and communicatively coupled to the one or more processors 102. The optical power generator 106 is configured to output an optical power beam, such as a laser beam. The optical power generator 106 may be placed on the outer surface of the autonomous vehicle 101. For example, the optical power generator 106 may be place at the top, front, side, or back of the autonomous vehicle 101. The optical power generator 106 may be directed to a predetermined direction. The predetermined direction may be pre-stored in the one or more memory modules 104. The predetermined direction may be a direction from the optical power generator 106 to the optical-to-electrical transducer 212 of the aerial vehicle 200. The details of the predetermined direction will be described below with reference to FIGS. 3A, 3B and 3C.

In some embodiments, the orientation of the optical power generator 106 may be adjusted using electrical motors. The one or more memory modules 104 may include instructions for adjusting the orientation of the optical power generator 106 based on the location of the aerial vehicle 200. For example, the orientation of the optical power generator 106 may be adjusted to direct toward the location of the optical-to-electrical transducer 212 of the aerial vehicle 200. As another example, the autonomous vehicle 101 may identify another aerial vehicle to direct an optical power beam. The autonomous vehicle 101 may determine the location of another aerial vehicle, and adjust the orientation of the optical power generator 106 to direct toward the location of another aerial vehicle. In some embodiments, the orientation of the optical power generator 106 may be fixed when the location of the optical-to-electrical transducer 212 of the aerial vehicle 200 is fixed relative to the location of the optical power generator 106.

Still referring to FIG. 2, a satellite antenna 108 is coupled to the communication path 114 such that the communication path 114 communicatively couples the satellite antenna 108 to other modules of the autonomous vehicle 101. The satellite antenna 108 is configured to receive signals from global positioning system satellites. Specifically, in one embodiment, the satellite antenna 108 includes one or more conductive elements that interact with electromagnetic signals transmitted by global positioning system satellites. The received signal is transformed into a data signal indicative of the location (e.g., latitude, longitude, and altitude) of the satellite antenna 108 or an object positioned near the satellite antenna 108, by the one or more processors 102. Additionally, it is noted that the satellite antenna 108 may include at least one of the one or more processors 102 and the one or memory modules 104. The satellite antenna 108 may be placed on or close to the optical power generator 106 such that the location of the optical power generator 106 may be obtained. The one or more memory modules 104 may include instructions for transmitting the location received by the satellite antenna 108 to the aerial vehicle 200.

Still referring to FIG. 2, one or more cameras 110 are coupled to the communication path 114 such that the communication path 114 communicatively couples the one or more cameras 110 to other modules of the autonomous vehicle 101. Each of the one or more cameras 110 may be any device having an array of sensing devices (e.g., pixels) capable of detecting radiation in an ultraviolet wavelength band, a visible light wavelength band, or an infrared wavelength band. Each of the one or more cameras 110 may have any resolution. The one or more cameras 110 may include an omni-directional camera, or a panoramic camera. In some embodiments, one or more optical components, such as a mirror, fish-eye lens, or any other type of lens may be optically coupled to at least one of the one or more cameras 110. The one or more cameras 110 may be used to capture an image of the aerial vehicle 200. In some embodiments, the autonomous vehicle 101 may not include the one or more cameras 110.

Still referring to FIG. 2, the network interface hardware 112 is coupled to the communication path 114 and communicatively coupled to the one or more processors 102. The network interface hardware 112 may be any device capable of transmitting and/or receiving data via a network. Accordingly, the network interface hardware 112 can include a communication transceiver for sending and/or receiving any wired or wireless communication. For example, the network interface hardware 112 may include an antenna, a modem, LAN port, Wi-Fi card, WiMax card, mobile communications hardware, near-field communication hardware, satellite communication hardware and/or any wired or wireless hardware for communicating with other networks and/or devices. In some embodiments, the network interface hardware 112 includes hardware configured to operate in accordance with the Bluetooth wireless communication protocol. In other embodiments, the network interface hardware 112 includes hardware configured to operate in accordance with a wireless communication protocol other than Bluetooth. The network interface hardware 112 of the autonomous vehicle 101 may communicate with the network interface hardware 208 of the aerial vehicle 200.

Still referring to FIG. 2, the one or more sensors 116 are coupled to the communication path 114 and communicatively coupled to the one or more processors 102. The one or more sensors 116 may detect the location of the aerial vehicle 200 and communicates the location information to the one or more processors 102. The one or more sensors 116 may include laser scanners, capacitive displacement sensors, Doppler effect sensors, eddy-current sensors, ultrasonic sensors, magnetic sensors, optical sensors, radar sensors, sonar sensors, LIDAR sensors, or the like.

Now referring to the aerial vehicle 200, the one or more processors 202 may be processors similar to the one or more processors 102 described above. The one or more memory modules 204 may be memories similar to the one or more memory modules 104 described above. The satellite antenna 206 may be an antenna similar to the satellite antenna 108. The network interface hardware 208 may be an interface hardware similar to the network interface hardware 112 described above. The communication path 216 may be a communication path similar to the communication path 114 described above.

The one or more cameras 210 are coupled to the communication path 216 such that the communication path 216 communicatively couples the one or more cameras 210 to other modules of the aerial vehicle 200. Each of the one or more cameras 210 may be any device having an array of sensing devices (e.g., pixels) capable of detecting radiation in an ultraviolet wavelength band, a visible light wavelength band, or an infrared wavelength band. Each of the one or more cameras 210 may have any resolution. The one or more cameras 210 may include an omni-directional camera, or a panoramic camera. In some embodiments, one or more optical components, such as a mirror, fish-eye lens, or any other type of lens may be optically coupled to at least one of the one or more cameras 210. The one or more cameras 210 are configured to capture an image of an area ahead of the autonomous vehicle 101 as map data. The aerial vehicle 200 may store the captured image in the one or more memory modules 204. The aerial vehicle 200 may transmit the captured image to the autonomous vehicle 101 as the map data 130 as shown in FIG. 1. The aerial vehicle 200 may also transmit the captured image to the transmission tower 140.

The optical-to-electrical transducer 212 is coupled to the communication path 216 such that the communication path 216 communicatively couples the optical-to-electrical transducer 212 to other modules of the aerial vehicle 200. The optical-to-electrical transducer 212 is configured to receive an optical power beam from the autonomous vehicle 101, convert the optical power beam to electrical power, and power the aerial vehicle 200 and/or charge the one or more batteries 214 using the electrical power. The satellite antenna 206 may be located on or close to the optical-to-electrical transducer 212 such that the location of the optical-to-electrical transducer 212 may be obtained. The aerial vehicle 200 may transmit the location of the optical-to-electrical transducer 212 to the autonomous vehicle 101.

In some embodiments, the aerial vehicle 200 is powered by the one or more batteries 214, each of which is electrically coupled to the various electrical components of the aerial vehicle 200. Each of the one or more batteries 214 may be any device capable of storing electric energy for later use by the aerial vehicle 200. In some embodiments, the one or more batteries 214 may include a rechargeable battery, such as a lithium-ion battery or a nickel-cadmium battery. In embodiments in which the one or more batteries 214 include a rechargeable battery, the electrical power from the optical-to-electrical transducer 212 is used to charge the one or more batteries 214. Thus, with the help of the optical-to-electrical transducer 212, the aerial vehicle 200 may continue to operate (e.g., flying) and provide map data to the autonomous vehicle 101 without landing to be charged.

Still referring to FIG. 2, the one or more sensors 218 are coupled to the communication path 216 and communicatively coupled to the one or more processors 202. The one or more sensors 218 may detect the location of the autonomous vehicle 101 and communicates the location information to the one or more processors 202. The one or more sensors 116 may include laser scanners, capacitive displacement sensors, Doppler effect sensors, eddy-current sensors, ultrasonic sensors, magnetic sensors, optical sensors, radar sensors, sonar sensors, LIDAR sensors, or the like.

Still referring to FIG. 2, the aerial vehicle 200 is communicatively coupled to the transmission tower 140 via a network 142. In some embodiments, the network 142 may include one or more computer networks (e.g., a personal area network, a local area network, or a wide area network), cellular networks, satellite networks and/or a global positioning system and combinations thereof. Accordingly, the aerial vehicle 200 can be communicatively coupled to the network 142 via a wide area network, via a local area network, via a personal area network, via a cellular network, via a satellite network, or the like. Suitable local area networks may include wireless technologies such as, for example, wireless fidelity (Wi-Fi). Suitable personal area networks may include wireless technologies such as, for example, IrDA, Bluetooth, Wireless USB, Z-Wave, ZigBee, and/or other near field communication protocols. Suitable cellular networks include, but are not limited to, technologies such as LTE, WiMAX, UMTS, CDMA and GSM.

The aerial vehicle 200 may transmit the image captured by the one or more cameras 210 as the map data 130 to the transmission tower 140 along with location information of the aerial vehicle 200 and/or the location information of the autonomous vehicle 101. Based on the location information, the transmission tower 140 may transmit the map data 130 to autonomous vehicles within a predetermined distance from the autonomous vehicle 101. For example, the autonomous vehicles 150, 160, and 170 are driving in an area proximate to the location of the autonomous vehicle 101, and the transmission tower 140 transmits the map data 130 to the autonomous vehicles 150, 160, and 170 such that the autonomous vehicles 150, 160, and 170 can use the map data 130 for autonomous driving.

Figure 3A:
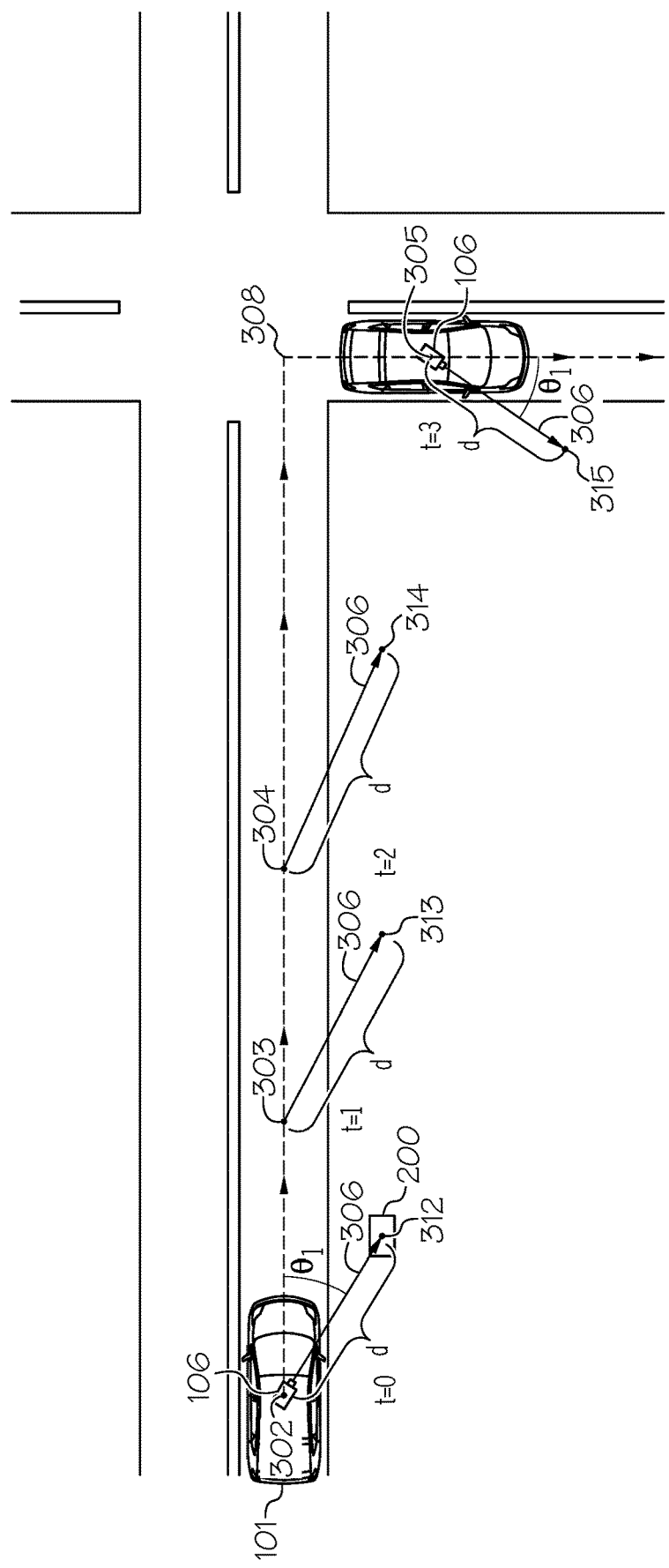
FIG. 3A depicts a top view of an autonomous vehicle and an aerial vehicle of the autonomous driving system, according to one or more embodiments shown and describe herein.
Figure 3B:
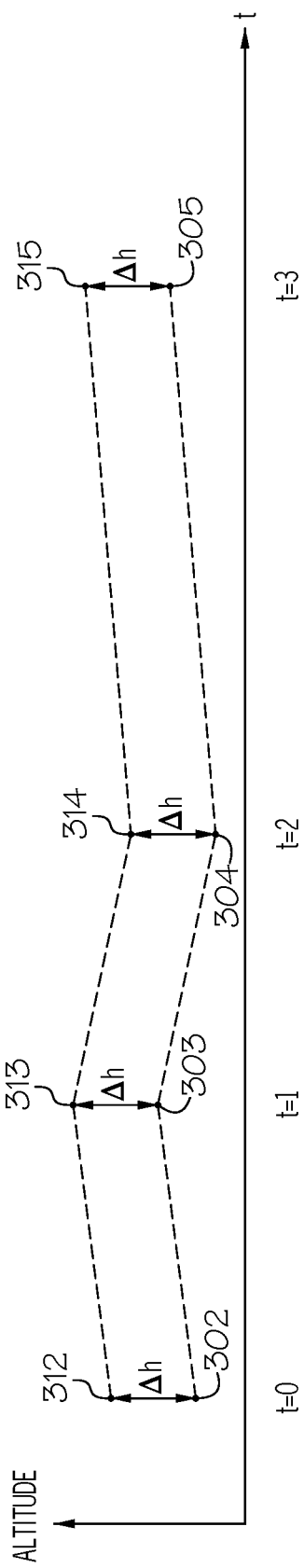
FIG. 3B depicts an altitude of the autonomous vehicle and an altitude of the aerial vehicle, according to one or more embodiments shown and describe herein.

FIGS. 3A and 3B depict relative locations of the autonomous vehicle 101 and the aerial vehicle 200. In embodiments, even when the autonomous vehicle 101 is driving, the aerial vehicle 200 may be located at a fixed point relative to the location of the autonomous vehicle 101 such that the optical power generator 106 directs the optical power beam to the aerial vehicle 200 without changing the orientation of the optical power generator 106. When the autonomous vehicle 101 is driving, the aerial vehicle 200 may receive a location of the optical power generator 106, a propagating direction of the autonomous vehicle 101, and/or a driving trajectory of the autonomous vehicle 101 in real time. The aerial vehicle 200 moves based on the location of the optical power generator 106, the propagating direction of the autonomous vehicle 101, and/or the driving trajectory of the autonomous vehicle 101 such that the aerial vehicle 200 is located at a fixed point relative to the autonomous vehicle 101.

FIG. 3A depicts a top view of the autonomous vehicle 101 and the aerial vehicle 200. FIG. 3A illustrates locations of the optical power generator 106 of the autonomous vehicle 101 driving in a propagating direction 308, and locations of the optical-to-electrical transducer 212 of the aerial vehicle 200 at different times. For example, at time t=0, the location of the optical power generator 106 of the autonomous vehicle 101 is at a point 302, and the location of the optical-to-electrical transducer 212 of the aerial vehicle 200 is at a point 312. The horizontal distance between the location of the optical power generator 106 of autonomous vehicle 101 and the location of the optical-to-electrical transducer 212 of aerial vehicle is distance d in FIG. 3A. A direction 306 is a direction from the point 302 to the point 312. The direction 306 is rotated clockwise by the amount of $\theta_1$ from the propagating direction 308 of the autonomous vehicle 101.

Figure 3C:
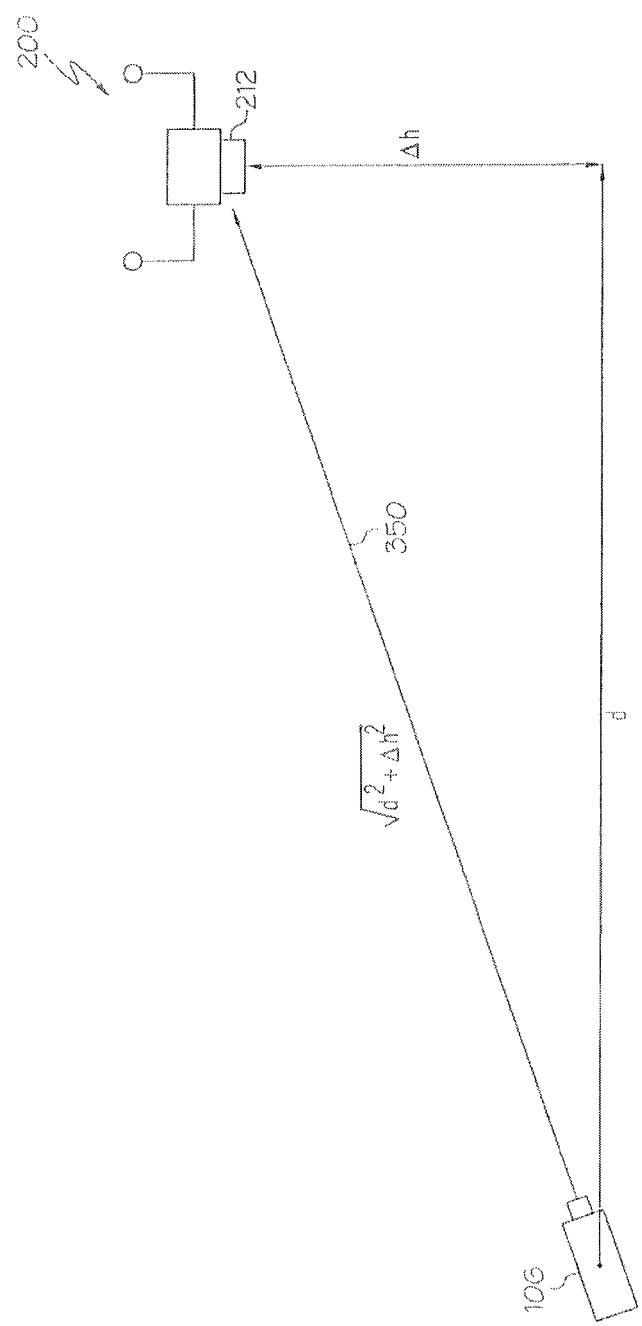
FIG. 3C depicts relative locations of the optical power generator of the autonomous vehicle and the optical-to-electrical transducer of the aerial vehicle in FIG. 3A.

FIG. 3B depicts an altitude of the optical power generator 106 of the autonomous vehicle 101 and an altitude of the optical-to-electrical transducer 212 of the aerial vehicle 200. By referring to FIG. 3B, the point 312 is higher than the point 302 by the amount of $\Delta h$ at time t=0. FIG. 3C depicts relative locations of the optical power generator 106 of the autonomous vehicle 101 and the optical-to-electrical transducer 212 of the aerial vehicle 200 shown in FIG. 3A. The distance d corresponds to the horizontal distance d in FIG. 3A, and the distance $\Delta h$ corresponds to the vertical distance $\Delta h$ in FIG. 3B. Thus, the actual distance between the optical power generator 106 of the autonomous vehicle 101 and the optical-to-electrical transducer 212 of the aerial vehicle 200 is a square root of $(d^2+\Delta h^2)$. In embodiments, the optical power generator 106 directs an optical power beam according to a direction 350. The direction 350 may be calculated based on the horizontal distance d, the vertical distance $\Delta h$, and the angle $\theta_1$ shown in FIG. 3A.

By referring back to FIGS. 3A and 3B, at time t=1, the location of the optical power generator 106 moves to a point 303. The location of the optical-to-electrical transducer 212 of the aerial vehicle 200 moves to a point 313 such that the optical-to-electrical transducer 212 of the aerial vehicle 200 is located at a fixed point relative to the location of the optical power generator 106 of the autonomous vehicle 101. As shown in FIG. 3B, the vertical distance between the point 313 and the point 303 is Δh which is the same as the vertical distance at t=0. This allows the optical power generator 106 to continuously direct the optical power beam 120 to the optical-to-electrical transducer 212 without changing the orientation of the optical power generator 106 even when the autonomous vehicle 101 is moving. Similarly, at time t=2, the location of the optical power generator 106 moves to a point 304. The location of the optical-to-electrical transducer 212 of the aerial vehicle 200 moves to a point 314 such that the optical-to-electrical transducer 212 of the aerial vehicle 200 is located at a fixed point relative to the location of the optical power generator 106 of the autonomous vehicle 101. As shown in FIG. 3B, the vertical distance between the point 314 and the point 304 is Δh which is the same as the vertical distance at t=0. At time t=3, the location of the optical power generator 106 moves to a point 304. The location of the optical-to-electrical transducer 212 of the aerial vehicle 200 moves to a point 314 such that the optical-to-electrical transducer 212 of the aerial vehicle 200 is located at a fixed point relative to the location of the optical power generator 106 of the autonomous vehicle 101. As shown in FIG. 3B, the vertical distance between the point 315 and the point 305 is Δh which is the same as the vertical distance at t=0.

While the aerial vehicle 200 stays at a fixed location relative to the autonomous vehicle 101 in FIGS. 3A 3B, and 3C, the aerial vehicle 200 may move away from the autonomous vehicle 101 to obtain map data. For example, if the one or more of the batteries 214 are sufficiently charged, the aerial vehicle 200 moves away from the autonomous vehicle 101 to obtain map data and return to the autonomous vehicle 101 to provide the map data to the autonomous vehicle.

Figure 4:
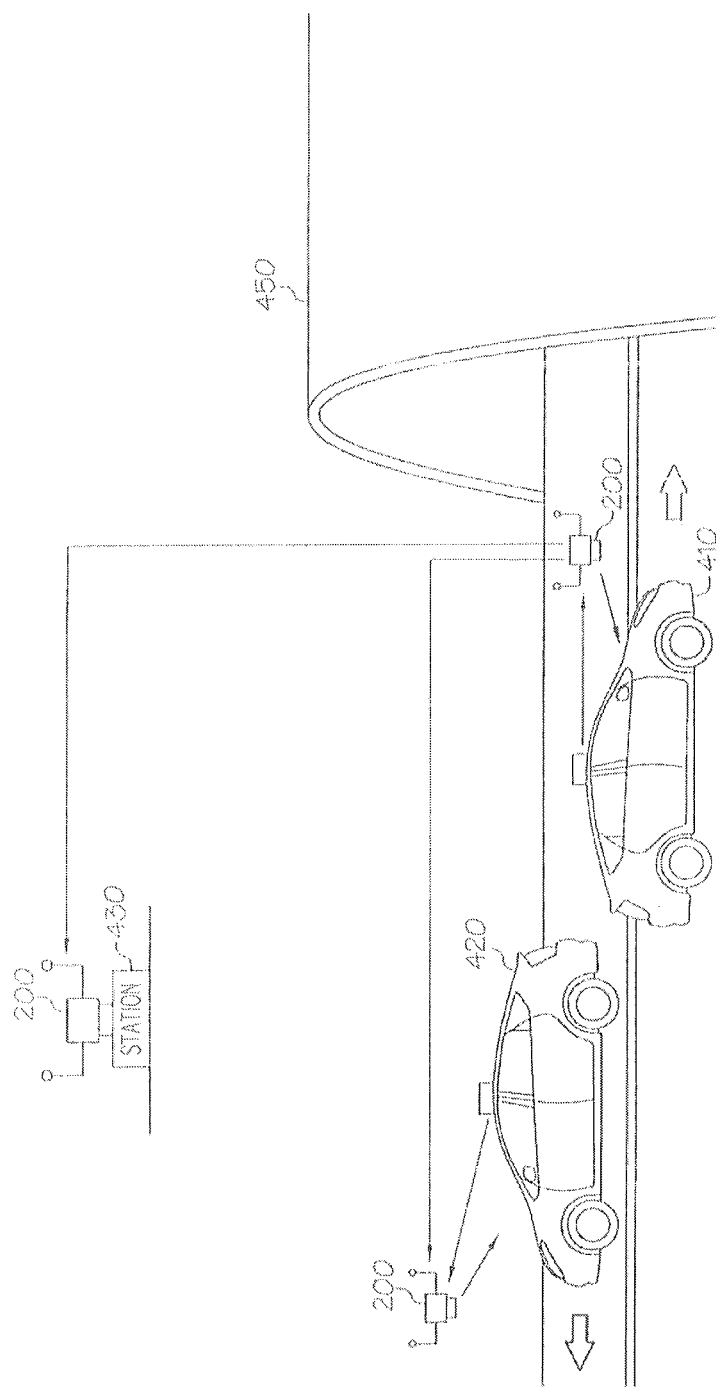
FIG. 4 depicts the operation of the aerial vehicle in situation where the aerial vehicle may not be charged by an autonomous vehicle, according to one or more embodiments shown and described herein.

FIG. 4 depicts the operation of the aerial vehicle 200 in situation where the aerial vehicle 200 may not be charged by an autonomous vehicle, according to one or more embodiments shown and described herein. In FIG. 4, the autonomous vehicle 410 is about to enter into an obstacle area 450 where the autonomous vehicle 410 cannot transmit an optical power beam to the aerial vehicle 200. The obstacle area 450 may include tunnel areas, underwater areas, etc. The autonomous vehicle 410 transmits a message to the aerial vehicle 200, e.g., indicating that the autonomous vehicle 410 is entering the obstacle area 450.

In embodiments, if the battery charging level of the aerial vehicle 200 is low, the aerial vehicle 200 searches for a charging station nearby. For example, the aerial vehicle 200 moves to a charging station 430 close to the aerial vehicle 200, the one or more batteries 214 of the aerial vehicle 200 are charged. The aerial vehicle 200 may transmit a message to the autonomous vehicle 410 that the aerial vehicle 200 will move to a charging station. In response to the message, the autonomous vehicle 410 may search for another aerial vehicle that can provide map data to the autonomous vehicle 410.

In some embodiments, the aerial vehicle 200 may move to another autonomous vehicle 420 that is moving in a direction away from the obstacle area 450. The aerial vehicle 200 initiates providing map data to the autonomous vehicle 420, and receiving optical power beams from the optical power generator of the autonomous vehicle 420. The aerial vehicle 200 may transmit a message to the autonomous vehicle 410 that the aerial vehicle 200 will move to another autonomous vehicle. In response to the message, the autonomous vehicle 410 may search for another aerial vehicle that can provide map data to the autonomous vehicle 410.

In some embodiments, if the battery charging level of the aerial vehicle 200 is relatively high (e.g., the aerial vehicle 200 can fly more than 30 minutes without charging), the aerial vehicle 200 may move to the other end of the tunnel area using the satellite antenna, and search for signals from the autonomous vehicle 410 at the other end of the tunnel area. Once the aerial vehicle 200 finds the autonomous vehicle 410 at the other end of the tunnel area, the aerial vehicle 200 continues to provide map data to the autonomous vehicle 410, and receive optical power beams from the optical power generator of the autonomous vehicle 410.

It should be understood that embodiments described herein are directed to an autonomous driving system. The autonomous driving system includes an aerial vehicle and an autonomous vehicle. The aerial vehicle includes an imaging, device configured to obtain map data, an optical-to-electrical transducer configured to convert optical power to electrical power for operating the aerial vehicle, one or more processors, one or more memory modules communicatively coupled to the one or more processors, and machine readable instructions stored in the one or more memory modules of the aerial vehicle that, when executed by the one or more processors, cause the aerial vehicle to output the map data. The an autonomous vehicle includes an optical power generator configured to transmit an optical power beam to the optical-to-electrical transducer of the aerial vehicle, one or more processors, one or more memory modules communicatively coupled to the one or more processors of the autonomous vehicle, and machine readable instructions stored in the one or more memory modules that, when executed by the one or more processors of the autonomous vehicle, cause the autonomous vehicle to receive the map data output by the imaging device from the aerial vehicle. By receiving power from an autonomous vehicle, the aerial vehicle may continue to operate without landing to be charged. Thus, the aerial vehicle may continuously provide map data to the autonomous vehicle without a stop.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. An autonomous driving system comprising:
    an aerial vehicle comprising:
        an imaging device configured to obtain map data;
        an optical-to-electrical transducer configured to convert optical power to electrical power for operating the aerial vehicle;
        one or more processors;
        one or more memory modules communicatively coupled to the one or more processors; and machine readable instructions stored in the one or more memory modules of the aerial vehicle that, when executed by the one or more processors, cause the aerial vehicle to output the map data; and an autonomous vehicle comprising:
an optical power generator configured to transmit an optical power beam to the optical-to-electrical transducer of the aerial vehicle;
one or more processors;
one or more memory modules communicatively coupled to the one or more processors of the autonomous vehicle; and
machine readable instructions stored in the one or more memory modules that, when executed by the one or more processors of the autonomous vehicle, cause the autonomous vehicle to receive the map data output by the imaging device from the aerial vehicle.

2. The autonomous driving system of claim 1, wherein the aerial vehicle comprises a chargeable battery, and the electrical power is configured to charge the chargeable battery.

3. The autonomous driving system of claim 1, wherein the machine readable instructions stored in the one or more memory modules of the aerial vehicle cause the aerial vehicle to move along a path such that the optical-to-electrical transducer of the aerial vehicle is located at a fixed location relative to a location of the optical power generator of the autonomous vehicle.

4. The autonomous driving system of claim 3, wherein the machine readable instructions stored in the one or more memory modules of the autonomous vehicle cause the autonomous vehicle to transmit at least one of a location of the autonomous vehicle, a propagating direction of the autonomous vehicle, and a driving trajectory of the autonomous vehicle to the aerial vehicle, and
the path is determined based on the at least one of the location of the autonomous vehicle, the propagating direction of the autonomous vehicle, and the driving trajectory of the autonomous vehicle to the aerial vehicle.

5. The autonomous driving system of claim 4, wherein the location of the autonomous vehicle includes a latitude, a longitude, and an altitude.

6. The autonomous driving system of claim 1, wherein the map data includes at least one of information about one or more roads, information about one or more obstacles on the one or more roads, and traffic information.

7. The autonomous driving system of claim 1, wherein the machine readable instructions stored in the one or more memory modules of the aerial vehicle cause the aerial vehicle to transmit the map data to one or more other autonomous vehicles within a predetermined distance from the autonomous vehicle through a transmission tower.

8. The autonomous driving system of claim 1, wherein the machine readable instructions stored in the one or more memory modules of the aerial vehicle cause the aerial vehicle to:
receive a message from the autonomous vehicle indicating the autonomous vehicle is going to enter an obstacle area; and
move to a charging station in response to receiving the message.

9. The autonomous driving system of claim 1, wherein the machine readable instructions stored in the one or more memory modules of the aerial vehicle cause the aerial vehicle to:
receive a message from the autonomous vehicle indicating the autonomous vehicle is going to enter an obstacle area;
move toward another autonomous vehicle in response to receiving the message; and
receive an optical power beam from the another autonomous vehicle.

10. An aerial vehicle comprising:
an imaging device configured to obtain map data;
an optical-to-electrical transducer configured to:
receive an optical power beam from an optical power generator of an autonomous vehicle; and
convert optical power of the optical power beam to electrical power for operating the aerial vehicle;
one or more processors;
one or more memory modules communicatively coupled to the one or more processors; and
machine readable instructions stored in the one or more memory modules that, when executed by the one or more processors, cause the aerial vehicle to output the map data to the autonomous vehicle.

11. The aerial vehicle of claim 10, further comprising a chargeable battery, wherein the electrical power is configured to charge the chargeable battery.

12. The aerial vehicle of claim 10, wherein the machine readable instructions stored in the one or more memory modules of the aerial vehicle cause the aerial vehicle to move along a path such that the optical-to-electrical transducer is located at a fixed location relative to a location of the optical power generator.

13. The aerial vehicle of claim 12, wherein the machine readable instructions stored in the one or more memory modules cause the aerial vehicle to receive at least one of a location of the autonomous vehicle, a propagating direction of the autonomous vehicle, and a driving trajectory of the autonomous vehicle to the aerial vehicle, and
the path is determined based on the at least one of the location of the autonomous vehicle, the propagating direction of the autonomous vehicle, and the driving trajectory of the autonomous vehicle to the aerial vehicle.

14. The aerial vehicle of claim 13, wherein the location of the autonomous vehicle includes a latitude, a longitude, and an altitude.

15. The aerial vehicle of claim 10, wherein the machine readable instructions stored in the one or more memory modules of the aerial vehicle cause the aerial vehicle to transmit the map data to one or more other autonomous vehicles within a predetermined distance from the autonomous vehicle through a transmission tower.

16. The aerial vehicle of claim 10, wherein the machine readable instructions stored in the one or more memory modules of the aerial vehicle cause the aerial vehicle to
receive a message from the autonomous vehicle indicating the autonomous vehicle is going to enter an obstacle area; and
move to a charging station in response to receiving the message.

17. The aerial vehicle of claim 10, wherein the machine readable instructions stored in the one or more memory modules of the aerial vehicle cause the aerial vehicle to
receive a message from the autonomous vehicle indicating the autonomous vehicle is going to enter an obstacle area;
move toward another autonomous vehicle in response to receiving the message; and receive an optical power beam from the another autonomous vehicle.

18. An autonomous vehicle comprising:
an optical power generator;
one or more processors;
one or more memory modules communicatively coupled to the one or more processors; and
machine readable instructions stored in the one or more memory modules that, when executed by the one or more processors, cause the autonomous vehicle to:
   transmit, by the optical power generator, an optical power beam to an aerial vehicle; and
   receive map data from the aerial vehicle.

19. The autonomous vehicle of claim 18, wherein the machine readable instructions stored in the one or more memory modules, when executed by the one or more processors, cause the autonomous vehicle to:
   determine whether the aerial vehicle is within a predetermined distance; and
   transmit, by the optical power generator, the optical power beam to the aerial vehicle in response to determining that the aerial vehicle is within the predetermined distance.

20. The autonomous vehicle of claim 18, wherein the machine readable instructions stored in the one or more memory modules of the autonomous vehicle cause the autonomous vehicle to transmit at least one of a location of the autonomous vehicle, a propagating direction of the autonomous vehicle, and a driving trajectory of the autonomous vehicle to the aerial vehicle.

* * * * *

UNITED STATES PATENT AND TRADEMARK OFFICE
CERTIFICATE OF CORRECTION

PATENT NO. : 10,579,069 B2
APPLICATION NO. : 15/728217
DATED : March 3, 2020
INVENTOR(S) : Ercan M. Dede Page 1 of 1

It is certified that error appears in the above-identified patent and that said Letters Patent is hereby corrected as shown below:

In the Specification

In Column 8, Line 43, delete "0₁" and insert --θ₁--, therefor.

In Column 9, Line 30, delete "3A 3B" and insert --3A, 3B--, therefor.

In Column 10, Line 17, after "imaging", delete ",".

In Column 10, Line 26, delete "The an" and insert --The--, therefor.

Signed and Sealed this
Fifth Day of May, 2020

Andrei Iancu
*Director of the United States Patent and Trademark Office*